United States Patent [19]

Hartstein

[11] 4,294,898

[45] Oct. 13, 1981

[54] SOLID STATE BATTERY

[75] Inventor: Allan M. Hartstein, Chappaqua, N.Y.

[73] Assignee: International Business Machines Corporation, Armonk, N.Y.

[21] Appl. No.: 146,965

[22] Filed: May 5, 1980

[51] Int. Cl.³ .................................................. H01M 6/18
[52] U.S. Cl. .................................. 429/104; 429/193; 429/218
[58] Field of Search ............... 429/193, 191, 104, 101, 429/30, 218, 112

[56]  References Cited

U.S. PATENT DOCUMENTS

| | | | |
|---|---|---|---|
| 2,631,180 | 3/1953 | Robinson | 429/137 |
| 3,404,035 | 10/1968 | Kummer et al. | 429/104 X |
| 3,748,178 | 7/1973 | Fally et al. | 429/193 X |
| 3,798,067 | 3/1974 | Kunze | 429/193 |
| 3,841,912 | 10/1974 | Kagawa et al. | 429/104 |
| 4,015,054 | 3/1977 | Cleaver et al. | 429/191 X |
| 4,041,220 | 8/1977 | Armand | 429/191 |
| 4,146,684 | 3/1979 | Fischer et al. | 429/104 |

*Primary Examiner*—Anthony Skapars
*Attorney, Agent, or Firm*—Pollock, Vande Sande & Priddy

[57]  ABSTRACT

A solid state rechargeable battery containing an alkali metal-containing electrode, a solid electrolyte, and an intercalation graphite-containing layer.

8 Claims, 1 Drawing Figure

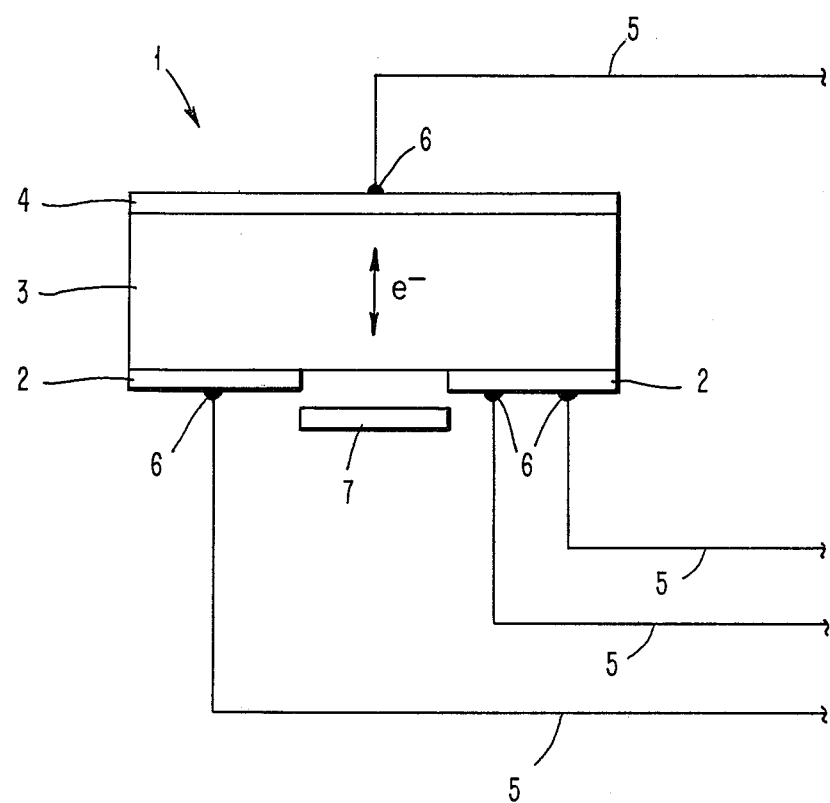

SOLID STATE BATTERY

DESCRIPTION

Technical Field

The present invention is concerned with solid state batteries and especially with solid state rechargeable batteries. The solid state batteries to which the present invention is directed are relatively lightweight and can be operated without the application of an external source of heat. The solid state batteries of the present invention are applicable in providing power for electronic devices which are portable, such as radios, calculators, and small computers, and mechanical electrically powered devices, such as automobiles and materials handling devices, such as fork lift trucks.

Background Art

Various batteries employing a solid state electrolyte have been developed over the last several years. In fact, certain batteries containing as the electrolyte $\beta$ alumina have been suggested. In particular, $\beta$ alumina has been suggested for liquid sodium batteries, such as that reported in U.S. Pat. No. 3,404,035 to Kummer. The liquid sodium battery suggested in U.S. Pat. No. 3,404,035 also employs liquid sulfur. A disadvantage of such a battery is that it requires elevated temperatures for operation. Another suggestion of a sulfur-sodium type electrochemical generator can be found in U.S. Pat. No. 3,748,178 to Fally et al wherein it is suggested to employ a sandwich of four layers with the first layer containing metallic sodium. The second or next layer is a solid electrolyte of sodium $\beta$ alumina. The third layer is a porous insulating layer which separates the dry, solid electrolyte from the fourth layer which is a positive active material, such as sulfur or sodium polysulfide and sulfur mixture, or phosphorous, or selenium, or an alkaline salt of one of the above elements. Both of the electrode materials are preferably in the liquid state. Moreover, the positive active material is impregnated in an electrically conductive material, such as graphite.

A completely solid state battery employing as a solid state electrode material certain interstitial compounds derived from graphite is suggested by Armand, New Electrode Material, Fast Ion Transport in Solids, Solid State Batteries and Devices, W. Van Gool, American Elsevier Publishing Company, Inc., 52 Vanderbilt Avenue, New York, New York, 1973, p. 665-673. The battery reported therein contains an electrode of sodium, an electrolyte of $\beta$ alumina, and a graphite chromium oxide interstitial compound. The interstitial compounds employed must contain graphite, a transition metal, and an electronegative nonmetal. The transition metal and electronegative nonmetal in the compound and electrode are essential according to the suggestions of Armand.

Also of interest is U.S. Pat. No. 2,631,180 to Robinson which suggests a sandwich of an alkali metal electrode encapsulated within a glass envelope which includes a barrier electrode on the other side of which is an electrically conductive oxidizing agent in contact with the glass.

Disclosure of Invention

The present invention is concerned with a solid state rechargeable battery. The battery includes at least three layers, the first layer of which is an alkali metal-containing electrode. Adjacent to the alkali metal-containing electrode is a solid electrolyte layer, next to which is a third layer containing intercalation graphite adapted to accept ions of the alkali metal migrating from the first layer.

The solid state rechargeable batteries of the present invention are lightweight and can operate at normal room temperatures and over a wide range of elevated temperatures.

BRIEF DESCRIPTION OF DRAWING

The FIGURE is a schematic illustration of a battery according to the present invention.

BEST AND VARIOUS MODES FOR CARRYING OUT INVENTION

One of the layers of the solid state rechargeable batteries of the present invention is an alkali metal-containing electrode or anode whereby the alkali metal or compound thereof is in the solid state. The preferred alkali metal electrodes include sodium, potassium, and lithium. In addition, it is preferred that the elemental metals per se be employed as the alkali metal electrode. Although, the alkali metal electrode in batteries of the present invention is in the form of a solid, the batteries of the present invention can be operated at elevated temperature whereby during the operation the alkali metal could be in the liquid state.

The solid electrolyte employed is a solid material which acts as a fast ion conductor for the alkali metal ions to pass therethrough. The solid electrolytes employed are materials which form into parallel or planar sheets separated by interstitial space. Within the interstitial space are present metal ions so that they can move back and forth between opposite edges of the material. Examples of some specific suitable solid electrolytes include a metal $\beta$ alumina and a metal $\beta''$ gallate. The metal present in the electrolyte must be one which is compatible with the metal of the anode. For instance, if the anode is a potassium electrode, it is preferred that the metal in the electrolyte be potassium. Likewise, for a sodium electrode, the preferred metal of the electrolyte is sodium. As mentioned hereinabove, $\beta$ alumina has been used in various suggested batteries. The battery is constructed such that the C-axis of the electrolyte is perpendicular to the direction of ionic flow of the ions of the electrode.

The next layer of the battery is a graphite-containing layer. The graphite is planar in structure and, like the electrolyte, forms parallel sheets. Accordingly, at least a portion of the graphite, and preferably a significant amount, if not substantially all, of the graphite present should be oriented so that the C-axis thereof is perpendicular to the direction of flow of the ions. The ions of the alkali metal can move through the electrolyte and then can be inserted or intercalated between the layers of graphite. To help visualize the movement of ions, it is advantageous to view the layers of the electrolyte, such as the alumina or gallates, as being set up like a stack of cards resting on edge upon the substrate of sodium or potassium metal. Thus, the sodium or potassium ions leaving the metal are free to migrate between the walls of confronting or adjacent layers of the electrolyte.

The graphite-containing layer is such that it is able to accept between the layers thereof ions of the alkali metal from the first layer. Although, it is preferred that the graphite layer be predominantly graphite, other materials can be present therewith so long as such do not interfere to an undesirable extent with the ability of the graphite to intercalate the ions of the alkali metal therein. It is essential to the practice of the present invention that the graphite be the material into which is inserted or intercalated the ions and that the graphite not merely be a matrix for some other material which interacts with the ions or that the graphite be merely present to increase conductivity of the electrode.

Since the ions of the alkali metal are merely intercalated in the graphite, the process is reversible, and accordingly the battery can be recharged. It is noted that in view of the high solubility of the alkali metal in the graphite, it will be possible to employ the batteries for longer periods of time without recharging.

The batteries can be prepared by joining the various layers by merely physically pressing them together and melting the alkali metal to form a coating. In addition, the graphite can be applied in the form of a paint or paste if desired. For convenience, however, the study of the battery, which will be discussed hereinbelow, employed vaporization of the potassium onto the electrolyte as the means for forming the article.

Reference to the FIGURE illustrates a battery employed to further illustrate the present invention wherein the battery is referred to generally by the numeral 1. The battery includes a layer of potassium 2 which was formed by evaporation of the potassium in a vacuum of about $10^{-6}$ torr onto the potassium $\beta$ alumina electrolyte 3. A mask 7 is used to prevent the potassium from depositing on a preselected portion of the potassium $\beta$ alumina electrolyte 3. The C-axis of the potassium $\beta$ alumina electrolyte 3 should be perpendicular to the flow of the ions which will be from north to south or from south to north in the direction indicated by the arrow. The third layer of the battery 1 is a graphite-containing layer 4 which was obtained by applying a graphite paste. Graphite pastes are commercially available, such as that available from Acheson Colloids Company under the trade designation Aquadag which contains, in addition to the graphite, ammonia, water, and a small amount of organic binder material. At least a portion of the graphite as coated is oriented so that the C-axes of the layer thereof are perpendicular to the flow of the ions.

The relative amounts of the various layers are not especially crucial to the present invention, except that the alkali metal layers should be sufficiently large that it is not completely consumed prior to saturating the interstices of the graphite. That is, some alkali metal should remain at the alkali metal electrode after the battery is fully charged. In addition, it is preferred that the electrolyte layers be as thin as possible. The device which was tested, however, employed an electrolyte which was about a half centimeter thick, but for more commercial products should be much thinner. In addition, the device tested included less than a millimeter of graphite layer and several thousand angstroms thickness of the potassium electrode. The battery also included several leads therefrom for testing purposes which were electrically connected to the electrodes by platinum pads. In normal battery operation it is only necessary to have one lead each from the two electrodes. The leads were connected to an electrometer, such as a Keithley 616 electrometer (not shown) in order to measure the voltage obtained and the rechargeability of the battery. An electrometer can measure voltage, resistance, and current by using different modes of operation. Upon discharging, the potassium ions flow from the potassium metal electrode through the electrolyte into the graphite while electrons flow through the lead wires from the potassium to graphite electrode. The battery was charged by selecting the resistance measuring mode of the electrometer. The resistance measuring mode or ohmic scale operates by forcing current through the circuit to build up voltage. When the resistance rose to about $100 \times 10^5$ ohms, the mode was switched to voltage reading mode which showed 7.3 volts. Next, the electrometer was switched to the discharging mode by measuring the current, which was about $1.6 \times 10^{-8}$ amps, and upon switching again to the voltage mode, such was about 3.6 volts showing discharge. Accordingly, the above clearly shows the charging and recharging ability of the battery of the present invention. Next, the battery was recharged by again switching to the resistance mode whereby about 7.3 volts was again obtained.

What is claimed is:

1. A solid state rechargeable battery comprising at least three layers including a first layer consisting essentially of an alkali metal-containing electrode in the solid state, a second solid electrolyte layer adjacent said first layer, and a third layer adjacent said second solid electrolyte layer consisting essentially of intercalation graphite adapted to accept ions of the alkali metal from the first layer, wherein said third layer is free from materials which interface to an undesirable extent with the ability of the graphite to intercalate the ions of said alkali metal therein, and wherein the C-axis of the solid electrolyte and at least a portion of the C-axis of said graphite layer are perpendicular to the flow of the alkali metal ions in the battery.

2. The battery of claim 1 wherein said alkali metal electrode contains sodium or potassium.

3. The rechargeable battery of claim 1 wherein said alkali metal electrode contains potassium.

4. The battery of claim 1 wherein said alkali metal electrode contains sodium.

5. The battery of claim 1 wherein said electrolyte layer is a metal $\beta$ alumina or a metal $\beta''$ gallate.

6. The battery of claim 1 wherein said electrolyte is an alkali metal $\beta$ alumina or an alkali metal $\beta''$ gallate.

7. The battery of claim 1 wherein said electrolyte is potassium alumina and said alkali metal electrode is potassium.

8. The battery of claim 1 wherein platinum leads are connected to the electrodes.

* * * * *

UNITED STATES PATENT AND TRADEMARK OFFICE
CERTIFICATE OF CORRECTION

PATENT NO. : 4,294,898

DATED : October 13, 1981

INVENTOR(S) : Allan M. Hartstein

It is certified that error appears in the above—identified patent and that said Letters Patent is hereby corrected as shown below:

Column 1:
    On line 31, change "al" to --al.--.

Column 3:
    On line 43, change "layer" to --layers--.

Column 4:
    On line 37, change "interface" to --interfere--.

Signed and Sealed this

Twenty-eighth Day of June 1983

[SEAL]

Attest:

GERALD J. MOSSINGHOFF

Attesting Officer     Commissioner of Patents and Trademarks